July 10, 1951     J. P. BUFFLE     2,559,936
FILTERING APPARATUS FOR LIQUIDS
Filed Dec. 3, 1946
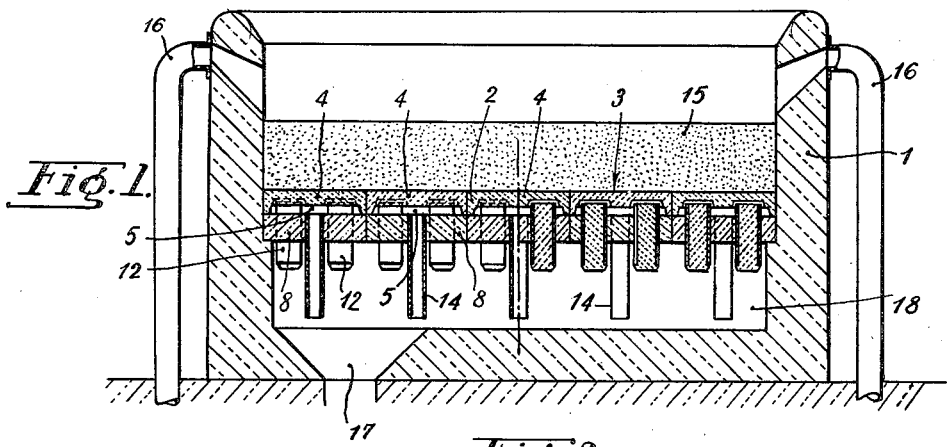
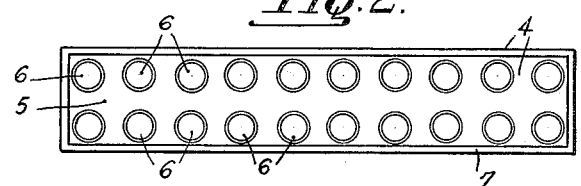
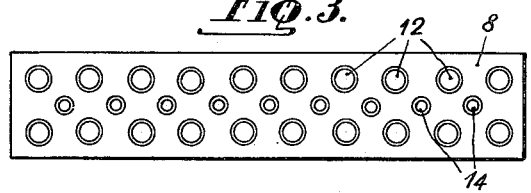
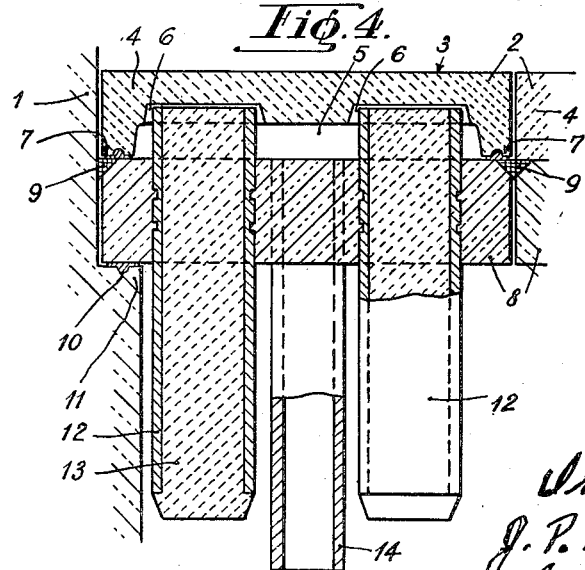
Inventor:
J. P. Buffle
by
E. F. Stenderoth
Atty Patented July 10, 1951

2,559,936

UNITED STATES PATENT OFFICE 2,559,936

FILTERING APPARATUS FOR LIQUIDS

Jean Philibert Buffle, Geneva, Switzerland, assignor to Services Industriels de Geneve, Geneva, Switzerland, a corporation Application December 3, 1946, Serial No. 713,714
In Switzerland June 17, 1946

6 Claims. (Cl. 210—130)

The present invention relates to a filtering apparatus for liquids.

Filtering of liquids is generally carried out by means of open or closed sand filters, functioning either by gravity or under pressure. The cleansing of the filter layer is effected either with purified liquid sent under pressure in a counter-current or with a mixture of the latter with compressed air. In the second case, the filter mass may be treated successively with the two fluids.

The apparatus and processes of filtering in current use present the following various drawbacks:

(a) Undesirable agitation of the filter mass at the entry point.

(b) Undesirable variations in filtration speed along the cross-section of the filter mass.

(c) More mechanical strength of prior used filtering surfaces.

(d) Undesirable free space not contributing to the filtering function.

(e) The use of metal filtrate containers.

(f) The unequal distribution of the compressed air and the compressed cleansing liquid, under the bottom, at the moment of the elimination of the matter in suspension retained by the filter mass.

(g) The use in certain devices of a single piping for the compressed air and the compressed cleansing liquid.

(h) The requirement of large quantities of washing liquid due to the small capacity of the liquid evacuating parts.

These various drawbacks result in sometimes obtaining an imperfectly filtered liquid, and in the exaggerated fouling of the filter mass. They also lead to the unequal distribution of the matter in suspension retained by the filter mass, which makes difficult the elimination of this matter in suspension from the filter mass, and causes an exaggerated consumption of cleansing liquid.

The present invention aims at obviating these drawbacks and it relates to a liquid-filtering apparatus which is characterised in that it comprises a tank in which a slab of porous substance is placed, the upper face of which is flat and smooth and on which a granular filter mass lies, while its lower face presents cells with no direct communication with one another, this slab being supported by a watertight floor or support which closes the said cells, with, on the one hand, water-flow tubes going through said watertight floor and opening into the cells, next to the part of the slab forming their base, and, on the other hand, by additional tubes the upper end of which opens into cavities provided for in the lower surface of the slab which makes up the ceiling of the cells, said additional tubes being used for the issue of gas in the aforesaid cavities, during the cleansing of the device.

The appended drawing represents, diagrammatically and in the way of an example, one embodiment of the apparatus according to the invention.

Figure 1 is a vertical section of the apparatus;

Figures 2, 3 and 4 are details of it, the latter on an enlarged scale.

The apparatus represented comprises a tank 1 containing, about halfway up, a slab 2 of a porous substance, preferably porous concrete, the upper face 3 of which is flat and smooth. This slab is made up of component units 4 placed side by side. Figure 2 represents one of these units as seen from underneath; each of the units 4 presents, on its lower face, a recess 5 and, at the bottom of this cell, a series of cavities 6 arranged as is shown in Figures 2 and 4. The border of the lower face of the units 4, designated by 7, rests on a watertight floor which consists of slabs 8 in waterproof concrete, placed side by side as is shown in the drawing. Means for ensuring watertightness are provided on the border 7 of the lower face of the slab, so that no direct communication exists between the different cells. Further watertight means 9 are provided between the different units 8 of the watertight floor and between these units 8 and the side-walls of the tank 1. Watertight means 10 are also provided between a shelf 11 of the tank and the units 8 which are supported by this shelf.

Figure 3 is a plan of one of the units 8 of the floor supporting the slab 2. Each of the units is traversed by a series of auxiliary tubes 12, of a non-metallic substance, open at their two ends and filled with porous concrete 13. The upper portion of each one of the auxiliary tubes 12 opens, very close to the porous slab, into one of the cavities 6. The lower portion of these tubes descends into the lower region of the tank.

Finally, a series of tubes 14 extends through each of the units 8. The upper ends of these tubes open flush with the upper face of the units 8, while their lower end opens into the bottom region of the tank 1.

The additional tubes 12, as well as the cavities 6 into which they penetrate, are arranged in a regular pattern as is shown in Figures 2 and 3.

A filter mass 15, consisting of sand, lies on the upper surface of the slab 2.

Pipes 16 lead into the upper region of the tank 1, while a pipe 17 opens into the bottom of the latter.

The apparatus represented operates as follows:

(a) Filtration phase

The liquid to be filtered, loaded with matter in suspension, is poured on to the mass 15 by a device not represented ensuring as uniform a distribution as possible and avoiding the formation of eddies. The liquid first goes through the filter mass 15, which retains the matter in suspension, then, once it is completely rid of this matter, it passes through the porous upper slab 2, which should not exercise any retentive effect. The flow through this porous slab occurs in a practically uniform manner throughout its whole surface, even close to the sides of the tank. The liquid having thus passed through the slab gathers on the false bottom consisting of the units 8 of the floor supporting the slab. Thence it flows into the collector chamber 18, formed by the lower region of the tank, through the tubes 14 and through the interior of the additional tubes 12—i. e., by traversing the porous conglomerate which fills them—the larger part of the liquid flowing, however, through the tubes 14. From there, the filtered liquid escapes by way of the pipes 17.

(b) Regeneration phase

After the apparatus has been working for a certain time, it is necessary to clear the filter mass 15 of the impurities that were in suspension in the liquid that has been filtered and which the mass had retained. To proceed with this regeneration of the filter mass 15, the pipe 17 for evacuating the purified liquid is closed and the liquid covering the filter mass is evacuated. Compressed air is introduced into the collector chamber 18. This air accumulates under the false bottom 8 and, the instant it reaches the base of the additional tubes 12, this air finds a way out through the porous conglomerate 13 with which these tubes are filled and escapes at their top in the form of a multitude of fillets issuing into the cavities of the recesses 5. From there, this air continues its upward course in a multitude of threads through the porous slab 2, which it leaves in provoking a stirring-up throughout the filter mass 15. During that part of the process of regeneration, and the following wherein an air current and a water flow are simultaneously introduced into the false bottom, the water-level remains invariably fixed with that of the base of the porous mass 13. As a result, air can only escape through the porous mass 13 and never through the tubes 14. The filter mass, violently agitated by the air issuing from the different additional tubes 12, separates itself from the impurities that it had extracted from the liquid. Afterwards, liquid purified beforehand and proceeding from a special container not represented is sent, under pressure, into the collector chamber 18. This liquid escapes upwards through the tubes 14 (which extend lower down than the bottom ends of the additional tubes 12), arrives in the recesses 5 and, pursuing its upward course, traverses the porous slab 2. During this time, the air continues to pass through the additional tubes 12 and through the slab 2 without being hampered in any way.

This simultaneous action of the air and the liquid has the effect of carrying towards the top of the tank the matter that the mass 15 had retained, whereas the mass itself, consisting of a denser substance, remains in the lower part of the space situated above the slab 2. This filter mass continues, notwithstanding that, to be constantly agitated. When the cleansing liquid loaded with matter in suspension reaches a certain level, the intake of air is stopped, a pause is made to allow the grains of the filter mass to settle and then the evacuation pipes 16 are opened. These latter, acting as a siphon, suck in the cleansing liquid loaded with all the matter in suspension which has been extracted from the filter mass 15 to the exclusion of the grains of the latter, which cannot be drawn up so high by the cleansing liquid because of their too great density. During the whole of this operation, the cleansing liquid continues to flow upwards from the bottom of the tank. The operation is stopped when the cleansing liquid is perfectly limpid.

The washing phase can be repeated immediately if the filter mass is not entirely rid of its impurities. When the regeneration phase is terminated, the filter mass automatically resumes its position and immediately presents a horizontal surface. The apparatus can then be set working again forthwith.

If the filtering operations are properly carried out and the filter mass, which must be perfectly adapted to its purpose, correctly and thoroughly cleansed after each filtration phase, there is no risk of fouling the porous slab. Its porosity should never vary, even after years of service.

The entire operations of filtration and elimination of the matter in suspenion may be rendered wholly automatic.

So that the slab 2 of porous concrete shall possess the requisite degree of porosity, the proper process for its manufacture would be as follows:

Perfectly screened fine gravel should be obtained which has passed through, for example, the 4-mm. sieve (square mesh) but been refused by the 2-mm. sieve. This fine gravel, which must be as homogeneous as possible from the point of view of its chemical composition, should be thoroughly washed and dried.

To prepare the porous concrete, 250 to 300 parts of this dry gravel is to be thoroughly mixed with perfectly homogeneous grout obtained by mixing 40 to 50 parts of a special cement possessing high physical resistance with 20 to 30 parts of water.

After prolonged stirring, suitable moulds are filled, completely closed so as to avoid too-rapid evaporation; the concrete is pressed down with a trowel, then left to set and it can be turned out of the mould three days after.

As regards the filter mass 15, it may consist of any granular substance sufficiently hard to resist exaggerated wear by the regeneration operation. The granulometry of this material should be perfect, the maximum variations from the diameter chosen not exceeding 15% more or less. According to the degree aimed at—pre-filtration or fine filtration—which is determined by the filtering speed the most appropriate, a substance should be chosen the diameter of which ranges between the minimum of 0.5 mm. and the maximum of 1.2 mm.

What I claim is:

1. A liquid-filtering apparatus comprising a tank, a slab of a porous substance in said tank, the upper face of said slab being flat and smooth, a granular filter mass positioned on said upper face, the lower face of said slab having recesses therein with no direct communication with one another, said slab having cavities therein opening into said recesses, a watertight support in said tank supporting said slab closing said recesses, water-flow tubes extending through said watertight support and opening into said recesses, and additional tubes extending through said support having their upper ends extending into said cavities, said additional tubes being used for the issue of gas into said cavities, during regeneration.

2. An apparatus as set forth in claim 1, wherein said slab is constructed of porous concrete.

3. An apparatus as set forth in claim 1, wherein said slab is formed of component units of porous concrete placed side by side.

4. An apparatus as set forth in claim 1, wherein said slab is formed of component units of porous concrete placed side by side and wherein the different units forming said slab are provided, at their lower ends, with watertight members placed between said units and said support to seal direct communication between said recesses.

5. An apparatus as set forth in claim 1, wherein said support is formed of several component units placed side by side and watertight members are provided between said units and between said units and said tank.

6. An apparatus as set forth in claim 1, wherein said additional tubes for the issue of gas are formed by tubes filled with porous concrete.

JEAN PHILIBERT BUFFLE.

REFERENCES CITED

The following references are of record in the file of this patent:

UNITED STATES PATENTS

| Number | Name | Date |
|---|---|---|
| 1,572,398 | Leopold | Feb. 9, 1926 |
| 1,698,079 | Wagner | Jan. 8, 1929 |
| 1,805,667 | Jenks | May 19, 1931 |
| 2,263,964 | Camp | Nov. 25, 1941 |
| 2,354,609 | Phipps | July 25, 1944 |
| 2,378,239 | Myron | June 12, 1945 |

FOREIGN PATENTS

| Number | Country | Date |
|---|---|---|
| 311,593 | Germany | Mar. 31, 1919 |
| 494,934 | Great Britain | Nov. 3, 1938 |
| 541,011 | France | July 21, 1922 |